United States Patent [19]

Corrigan

[11] 4,088,377
[45] May 9, 1978

[54] RECOIL SPRING LOCK DEVICE
[75] Inventor: Ara L. Corrigan, Dunlap, Ill.
[73] Assignee: Caterpillar Tractor Co., Peoria, Ill.
[21] Appl. No.: 655,940
[22] Filed: Feb. 6, 1976
[51] Int. Cl.$^2$ ............................................. B62D 55/30
[52] U.S. Cl. ........................................ 305/10; 29/227;
254/10.5; 305/31; 305/60
[58] Field of Search ........................ 305/10, 22, 31, 60;
254/10.5; 29/227; 92/23, 128

[56] References Cited
U.S. PATENT DOCUMENTS

| | | | |
|---|---|---|---|
| 3,101,977 | 8/1963 | Hyler et al. | 305/10 |
| 3,474,710 | 10/1969 | Stryker | 92/128 |
| 3,963,047 | 6/1976 | Moring | 305/10 X |
| 3,980,351 | 9/1976 | Orr et al. | 305/10 |

Primary Examiner—Stanley H. Tollberg
Assistant Examiner—John P. Shannon
Attorney, Agent, or Firm—Phillips, Moore, Weissenberger, Lempio & Majestic

[57] ABSTRACT

In a track tensioning apparatus for a tracked vehicle, recoil lock device is provided to prevent unintentional release of a prestressed helical spring during disassembly of the apparatus. Partial compression of the spring is necessary for assembly or disassembly of the track tensioning apparatus and installation or removal of the recoil lock device. Such compression may be accomplished by utilizing the tensioning apparatus, or before assembly by utilizing a specially configured compression device. The recoil lock device are retained in a lock position by a retainer ring engaging narrowed mid-portions of spatially separated pin members of the recoil lock device.

5 Claims, 4 Drawing Figures

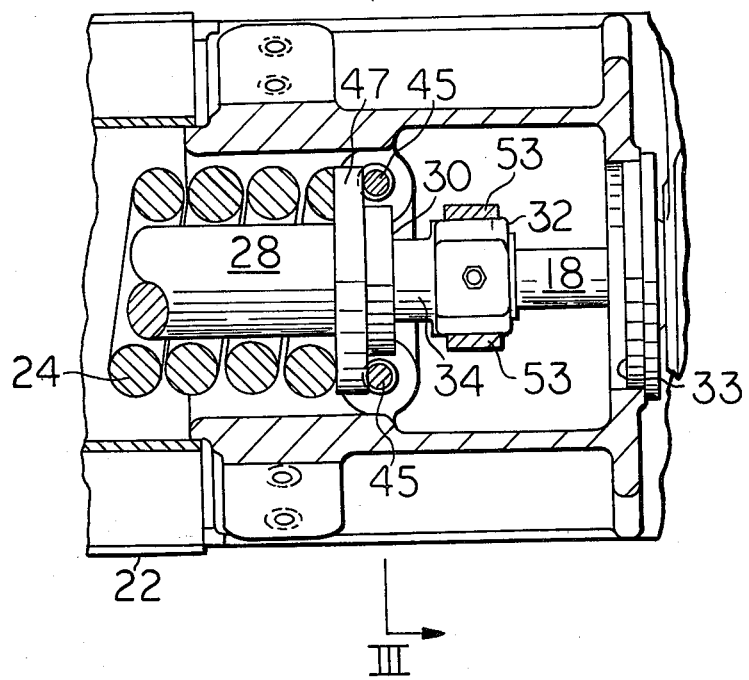
Fig_2_
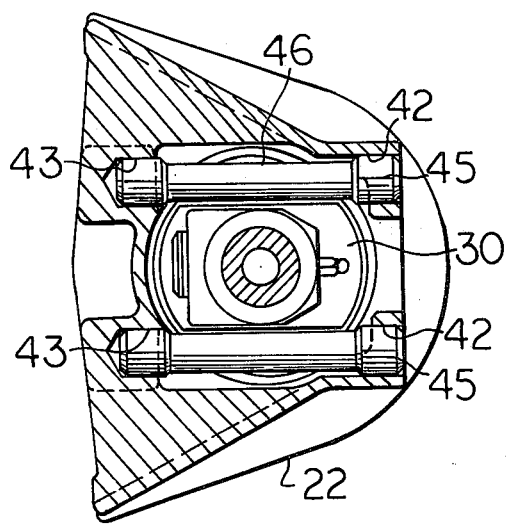
Fig_3_

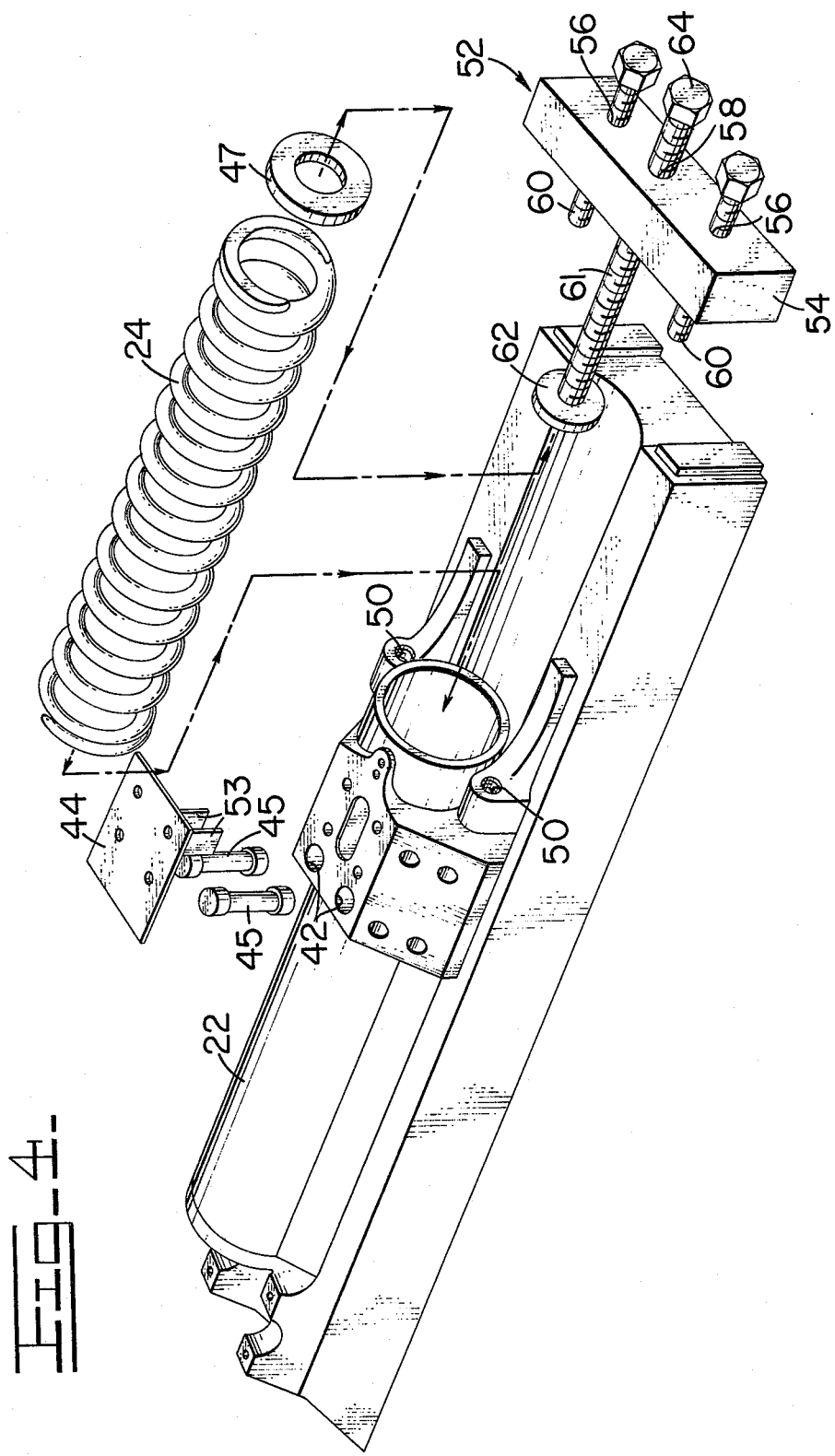

RECOIL SPRING LOCK DEVICE

BACKGROUND OF THE INVENTION

In tracked vehicles, a device is provided to maintain tension of the track. Such devices are generally associated with the track recoil system which normally includes a large helical spring to provide recoil action to one of two track frame members, the recoil action being necessitated by any shock imposed on the rotating members driving the track. Normally installation and removal of the various elements of the recoil mechanism and track tensioning apparatus is done at shop facilities where special tools are available to handle compression of the helical spring. In the field, work is not usually performed on these elements; however locking means to prevent release of the helical spring during such work has been found desirable.

SUMMARY OF THE INVENTION

It is the primary object of this invention to provide lock means for a tensioning apparatus having a stressed helical recoil spring in a tracked vehicle which avoids unnecessary release of the stressed helical recoil spring upon disassembly of the apparatus.

It is a further object of this invention to provide recoil lock means which, while providing the above object, is easily installed and may be removed only upon further compression of the helical recoil spring.

It is still a further object of this invention to provide recoil lock means which may be installed by utilizing the tensioning apparatus to compress the helical recoil spring.

It is still a further object of this invention to provide a recoil lock means which may be installed prior to full assembly of the tensioning apparatus by utilizing a specially configured compression device.

Broadly stated the invention is a recoil lock means in combination with a track tensioning device, the track tensioning device comprising first and second portions generally reciprocable so as to be movable in one or the other directions relative to each other, with the first portion comprising a housing open at one end and closed at the other. The housing has a helical spring disposed therein and engaging the closed end of the housing. The track tensioning device further includes a retainer ring and an open ended cylinder axially aligned with the helical spring. The open ended cylinder defines a flange at its open end for engagement with the retainer ring distal of the helical spring. The combination further comprises lock means for retaining the helical spring in the open ended housing in at least a partially compressed state. The lock means includes two elongated retaining pin members removably disposed in the housing with the retaining ring disposed between the helical spring and the retaining pins. The retaining pins are spatially separated to allow the second portion to pass therebetween and compress the helical spring.

BRIEF DESCRIPTION OF THE DRAWINGS

These and other objects of the invention will become apparent from a study of the following specification and drawings, in which:

FIG. 2 is a plan view partly in section of a portion of the track tensioning device illustrated in FIG. 1.

FIG. 3 is an elevation view in section taken at line III—III of FIG. 2.

FIG. 4 is an exploded perspective view of portions of the track tensioning device illustrated in FIG. 1 showing the helical spring removed therefrom and a compression device which may be used as an alternative installation tool.

DETAILED DESCRIPTION OF THE PREFERRED EMBODIMENT

Figure 1:
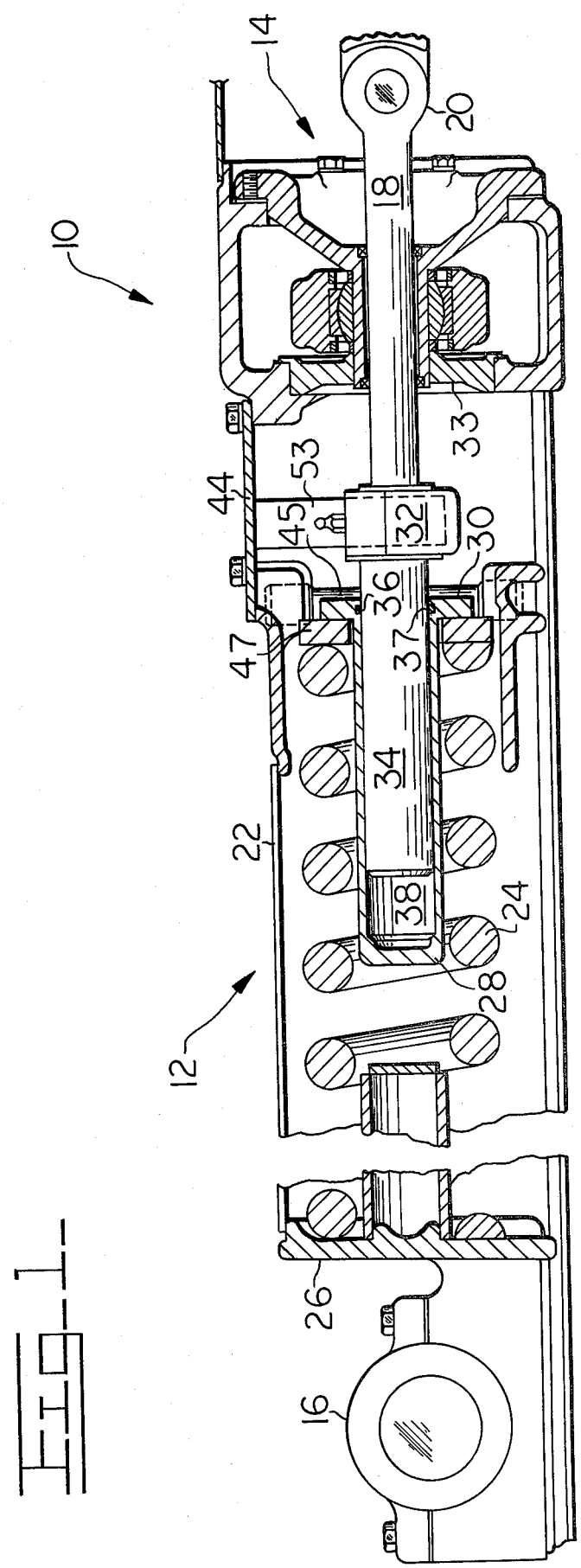
FIG. 1 is an elevation view partly in section of an assembled track tensioning device with recoil lock means incorporated.

Referring to FIG. 1, a track tensioning apparatus 10 for a tracked vehicle is illustrated having a first portion 12 and a second portion 14. The second portion 14 is generally reciprocal in relation to first portion 12. Disposed around first portion 12 and second portion 14 may be an endless track (not shown) to provide traction for the vehicle. The first portion 12 is provided with a mounting assembly 16 for a track drive mechanism. Rod 18 of the second portion is provided with eye 20 for similar mounting of a second track drive mechanism. First portion 12 is comprised of an elongated housing 22 with a closed end 26 and having disposed therein a helical spring 24 engaging the closed end. Axially located within the coils of the helical spring is an open ended cylinder 28 defining a flange 30 at the open end thereof. Disposed between flange 30 and helical spring 24 is annular retainer ring 47.

Rod 18 has affixed at the end opposite eye 20 a valve means 32. Rigidly affixed to valve means 32 is a piston 34 disposed in open ended cylinder 28. A seal 36 is provided in annular groove 37 of flange 30 to form a closed cavity 38 in open ended cylinder 28 with piston 34 disposed therein.

Helical spring 24 is retained in a partially compressed state as shown in FIG. 1 by recoil lock means comprised of two pin members 45. Referrring to FIG. 3, pin members 45 are shown in position in housing 22. Housing 22 defines in its upper surface generally adjacent flange 30 a pair of spatially separated apertures 42, and in its lower surface axially aligned with apertures 42 a pair of spatially separated bores 43. Each pin member is disposed through an aperture 42 and in a corresponding bore 43. Pin members 45 are formed with a constructed mid-portion. The mid-portion is sized ro receive retainer ring 47 which abuts helical spring 47. This prevents removal of pin members 45 in addition to acting as a bearing surface to preserve the face of flange 30 from possible scarring upon insertion of pin members 45. Flange 30 is sized to fit between pin members 45. A cover plate member 44 having two spatially separated legs 53 is affixed to first portion 12 in the vicinity of valve means 32. The legs 53 extend downwardly to lie adjacent to valve means 32 and thereby prevent rotation thereof.

In operation, helical spring 24 may be placed in a partially compressed state to allow insertion of pin members 45 by one of two methods. As configured in FIG. 1, that is in a partially assembled state with piston 34 disposed in cylinder 38 and pin members 45 not installed, a substantially incompressible fluid may be introduced through valve means 32 which includes a passage means leading to cavity 38. The substantially incompressable fluid when supplied through valve means 32 under pressure, will first move the valve means rightwardly until contact with surface 33 is made, then cylinder 28 and ring 47 move leftwardly thereby compressing helical spring 24 sufficiently to allow pin members 45 to be installed through apertures 42 and bores 43. When pin members 45 are so installed, pressure may be relieved at valve means 32 allowing retainer ring 47 to seat in mid-portions 46 of the pin members. Continued relief of pressure at valve means 32 will move the valve means leftwardly to allow installation of rod 18 and the associated drive mechanism at eye 20. After the endless track is installed, the substantially incompressible fluid may again be introduced in valve means 32 to tension the track. Finally, cover 44 with legs 53 may be installed. It is emphasized that in the aforedescribed condition, that is with pin members 45 restraining the helical spring, piston 34 and cylinder 38 may be removed for maintenance without relieving the tension on the helical spring.

Provided with the recoil lock means is an alternate means for installing pin members 45. Housing 22 defines axially aligned threaded bures 50 (see FIG. (4 in which a compression device 52 may be fitted. The compression device may be used prior to disposing cylinder 28 in helical spring 24. Compression device 52 is comprised of a rigid bar 54 defining three parallel bores, the outer two bores 56 spaced substantially equal to the separation of bores 50 defined by housing 22. The center bore 58 is threaded and positioned substantially at the midpoint of the line connecting the centers of bores 56. Disposed in outer bores 56 are two bolt means 60 adapted to be threadably engaged in bores 50 of housing 22 to rigidly retain rigid bar 54 in alignment with helical spring 24 when disposed in housing 22. Threadably engaged in center bore 58 is a rod member 61 having rotatably affixed at one end a plate 62 having a width less than the spatial separation of installed pin members 45. The opposite end of rod 60 is adapted and configured with a hexagonal head member 64 or the like so that torque may be applied thereto. Helical spring 24 is disposed in housing 22 with retaining ring 47 abutting the right hand end of the helical spring as illustrated in FIG. 4. Compression device 52 is then affixed to housing 22, and torque applied to hexagonal head member 64 to urge plate 62 inwardly against retainer ring 47 to compress helical spring 24 sufficiently to allow pin members 45 to be inserted through apertures 42 and disposed in bores 43. When pin members 45 are so installed, the compression placed on helical spring 24 may be partially relieved by backing off on rod member 61 to allow retainer ring 47 to seat in mid-sections 46 thereby preventing removal of the pin members. Further assembly of the track tensioning apparatus may then be undertaken.

I claim:

1. In combination with a track-tensioning device, the track-tensioning device comprising first and second portions generally reciprocable so as to be movable in one and the other directions relative to each other, said first portion including a housing open at one end and closed at the opposite end, a helical spring disposed therein and engaging the closed end of said housing, a retainer ring and an open-ended cylinder axially aligned with the helical spring and defining a flange at its open end for engagement with the retainer ring distal of said helical spring; lock means for retaining the helical spring in the open-ended housing in at least a partially compressed state, said lock means comprising two elongated retaining pin members removably disposed in said housing with said retaining ring disposed between said helical spring and said retaining pins, said retaining pins spatially separated to allow the second portion to pass therebetween and compress said helical spring.

2. The combination set forth in claim 1 wherein each pin member defines a constricted mid-portion for engageably receiving the retainer ring while said pins are disposed in the housing and the helical spring is in a partially compressed state.

3. The combination set forth in claim 2 wherein the second portion further comprises a piston reciprocably disposed in the open-ended cylinder; and a rod rigidly affixed to said piston and extending outwardly therefrom;

said piston defining with said open-ended cylinder a cavity and further said piston including valve means communicating with said cavity for selectively introducing a substantially incompressible fluid into said cavity to urge said cylinder outwardly of said piston to partially compress said helical spring whereby the pin members may be disposed in said housing.

4. The combination set forth in claim 3 wherein the housing defines two aperturs generally adjacent to the flange of the open ended cylinder while the helical spring and said cylinder are disposed in said housing and having axes generally perpendicular to said helical spring, said housing further defining two counterbores axially aligned with said apertures and on the opposite side of said housing from said apertures;

each opposed aperture and counterbore sized to receive a pin member.

5. The combination set forth in claim 1 wherein the housing further defines a pair of threaded bores adjacent the open end thereof, one on either side of the open end and having axis parallel to the longitudinal axis of said housing, and the combination further comprising a spring compression device, said spring compression device comprisng a rigid bar, a pair of threaded bolts and a threaded rod, the rigid bar defining three parallel bores, the outer two bores spaced substantially equal to the separation of the pair of threaded bores in said housing, the center bore being threaded and located substantially at the mid-point of the line connecting the centers of the two outer bores, the threaded rod having associated at one end a plate of dimension less than the separating distance between the two elongated retaining pins when said retaining pins are disposed in said housing and configured at the other end so that torque may be applied thereto;

said threaded bolts disposable through said outer bores to threadably engage said threaded bores of the housing and said circular plate engageable with the retainer ring so that torque applied to said rod compresses said helical spring to allow the pin members to be disposed in the housing.

* * * * *